US007274371B2

(12) United States Patent
Cheng et al.

(10) Patent No.: US 7,274,371 B2
(45) Date of Patent: Sep. 25, 2007

(54) DISPLAY CONTROLLER AND ASSOCIATED METHOD

(75) Inventors: Kun-Nan Cheng, Hsin-Chu (TW); Jui-Hung Hung, Hsin-Chu (TW)

(73) Assignee: MStar Semiconductor, Inc., ChuPei, Hsin-Chu Hsien (TW)

( * ) Notice: Subject to any disclaimer, the term of this patent is extended or adjusted under 35 U.S.C. 154(b) by 370 days.

(21) Appl. No.: 10/906,741

(22) Filed: Mar. 3, 2005

(65) Prior Publication Data

US 2005/0195204 A1 Sep. 8, 2005

Related U.S. Application Data

(60) Provisional application No. 60/549,985, filed on Mar. 5, 2004.

(51) Int. Cl.
*G09G 5/36* (2006.01)
*G06T 1/60* (2006.01)

(52) U.S. Cl. ....................................... 345/558; 345/530

(58) Field of Classification Search ................ 345/531, 345/558, 656, 530; 348/484
See application file for complete search history.

(56) References Cited

U.S. PATENT DOCUMENTS 6,750,876 B1 * 6/2004 Atsatt et al. ................ 345/656
2002/0171761 A1 * 11/2002 Suzuki et al. ............... 348/484

FOREIGN PATENT DOCUMENTS

| | | |
|---|---|---|
| JP | 63255747 A | 10/1988 |
| JP | 2000098993 | 4/2000 |
| JP | 2003295848 A | 10/2003 |
| TW | 293117 | 12/1996 |
| TW | 538401 | 6/2003 |

* cited by examiner

*Primary Examiner*—Kee M. Tung
*Assistant Examiner*—Jacinta Crawford
(74) *Attorney, Agent, or Firm*—Winston Hsu

(57) ABSTRACT

A data-playing controller includes a register for storing a plurality of control parameters, a first-in-first-out buffer (FIFO) for storing data, and a control circuit capable of accessing a memory dynamically. The register can be electrically connected to a data-playing device. The control circuit can store the control parameters via the FIFO to the memory first, and then transfer the control parameters stored in the memory via the FIFO to the register during a synchronizing blank period.

10 Claims, 6 Drawing Sheets

DISPLAY CONTROLLER AND ASSOCIATED METHOD

CROSS REFERENCE TO RELATED APPLICATIONS

This is a non-provisional application of U.S. provisional application No. 60/549,985, which was filed on 05 Mar., 2004 and is included herein by reference.

BACKGROUND OF INVENTION

1. Field of the Invention

The present invention relates to a display controller and related method, and more particularly, to a display controller capable of writing a plurality of control parameters into a display control register and related method.

2. Description of the Prior Art

Please refer to FIG. 1, which is a functional block diagram of a video display system 10 according to the prior art. The video display system 10 comprises a video display device 12 for displaying video, and a display control register 14 coupled to the video display device 12. The display control register 14 stores control parameters, which are control data for the display control register 14 to control the video display device 12 to display video. The display control register 14 can be updated at any time, so that the video display device 12 may have a video-flickering or even a video-interruption problem during a non-blanking period when the video display device 12 displays video.

Please refer to FIG. 2, which is a functional block diagram of a video display system 20, which is proposed to overcome the drawbacks of the video display system 10. In addition to the video display device 12 and the display control register 14, the video display system 20 further comprises a secondary register 24 coupled to the display control register 14.

Though able to be updated at any time, the same as the display control register 14, the secondary register 24 will copy the control parameters to the display control register 14 at any time other than the non-blanking period. Therefore, the video display system 20 is free of both the video-flickering and the video-interruption problems. However, because the secondary register 24 is installed to accompany the display control register 14, and the video display system 20 usually requires hundreds of register cells in display control register 14, the video display system 20 thus requires as many as hundreds of corresponding register cells in the secondary register 24 and has a high cost in consequence.

SUMMARY OF INVENTION

It is therefore a primary objective of the claimed invention to provide a video controller and related method to overcome the above-mentioned problems.

According to the claimed invention, the display controller comprises a display control register for storing a plurality of control parameters. The display control register is coupled to a video display device, a first-in-first-out buffer (FIFO) for storing data, and a control circuit coupled to the display controller and the FIFO for accessing a memory. The control circuit is capable of storing the control parameters via the FIFO to the memory, and then transferring the control parameters stored in the memory via the FIFO to the display control register during a synchronizing blank period.

Moreover, the present invention further discloses a method for writing a plurality of control parameters into a display control register. The method includes the steps of detecting a triggering of a memory writing signal, storing the control parameters via a FIFO to a memory in response to the triggering of the memory writing signal, and writing the control parameters stored in the memory to the display control register via the FIFO during a synchronizing blank period. The synchronizing blank period is preferably determined by detecting a falling edge of the DE signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
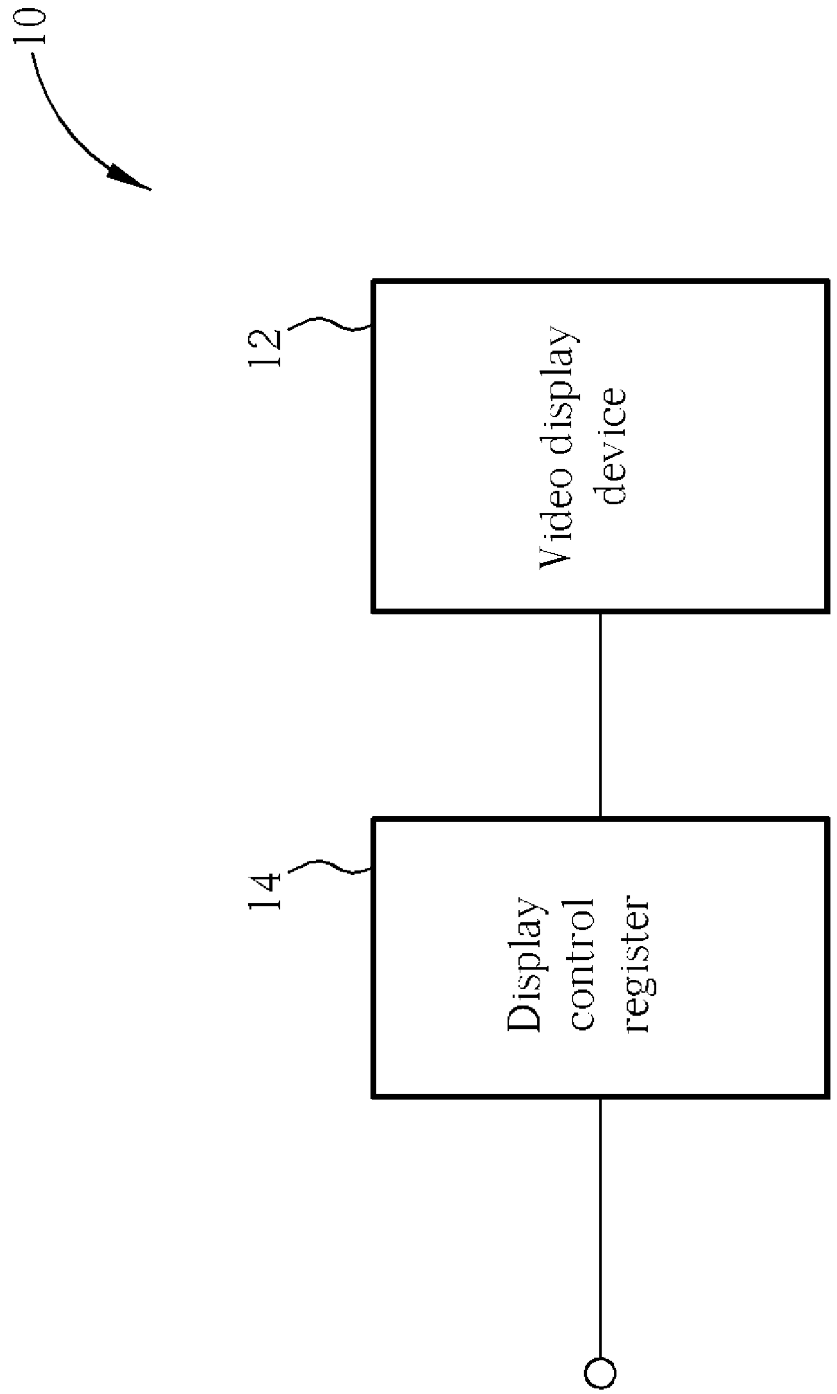
Fig. 1 Prior art
FIG. 1 is a functional block diagram of a video display system according to the prior art.
Figure 2:
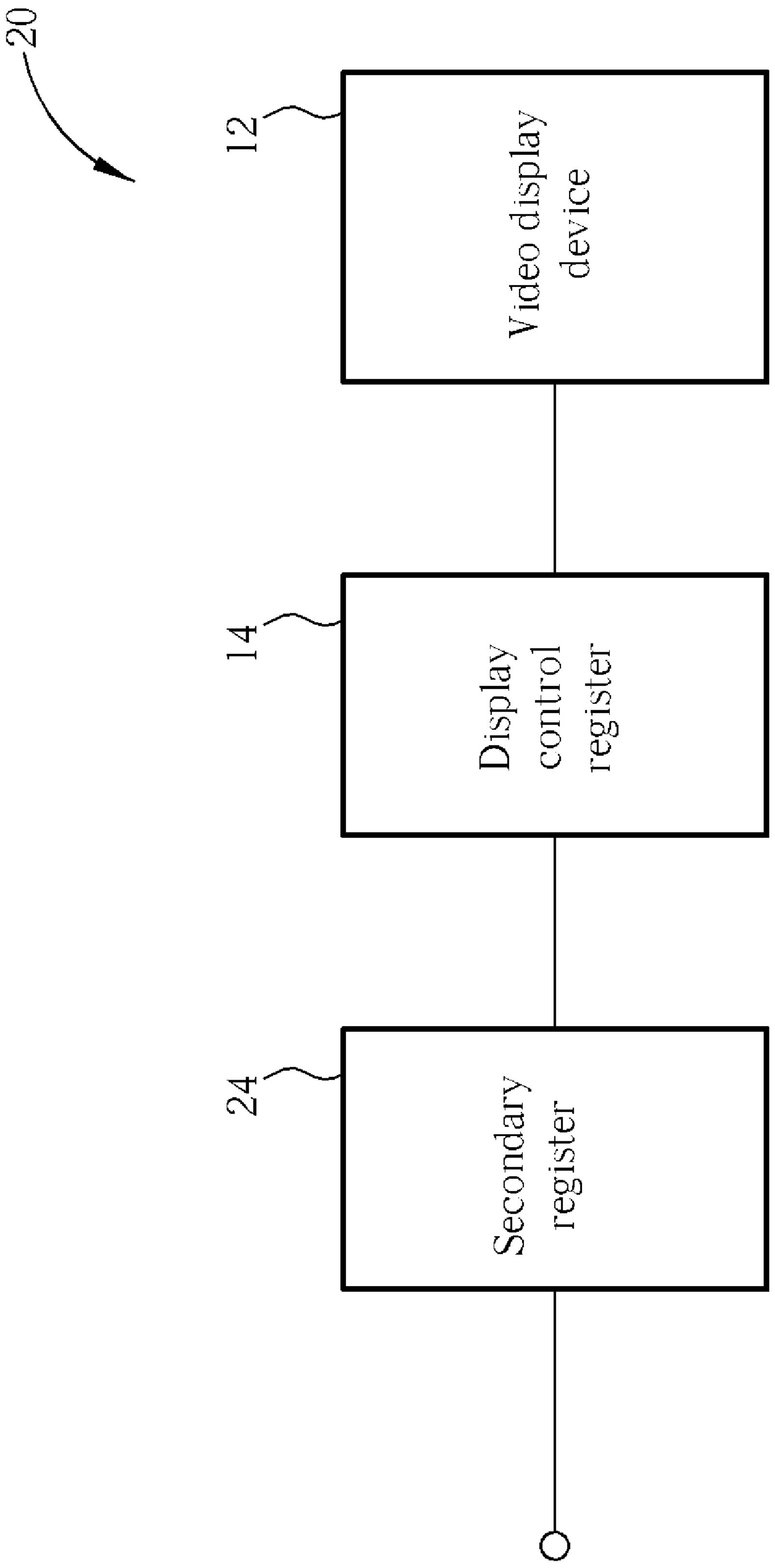
Fig. 2 Prior art
FIG. 2 is a functional block diagram of another video display system according to the prior art.
Figure 3:
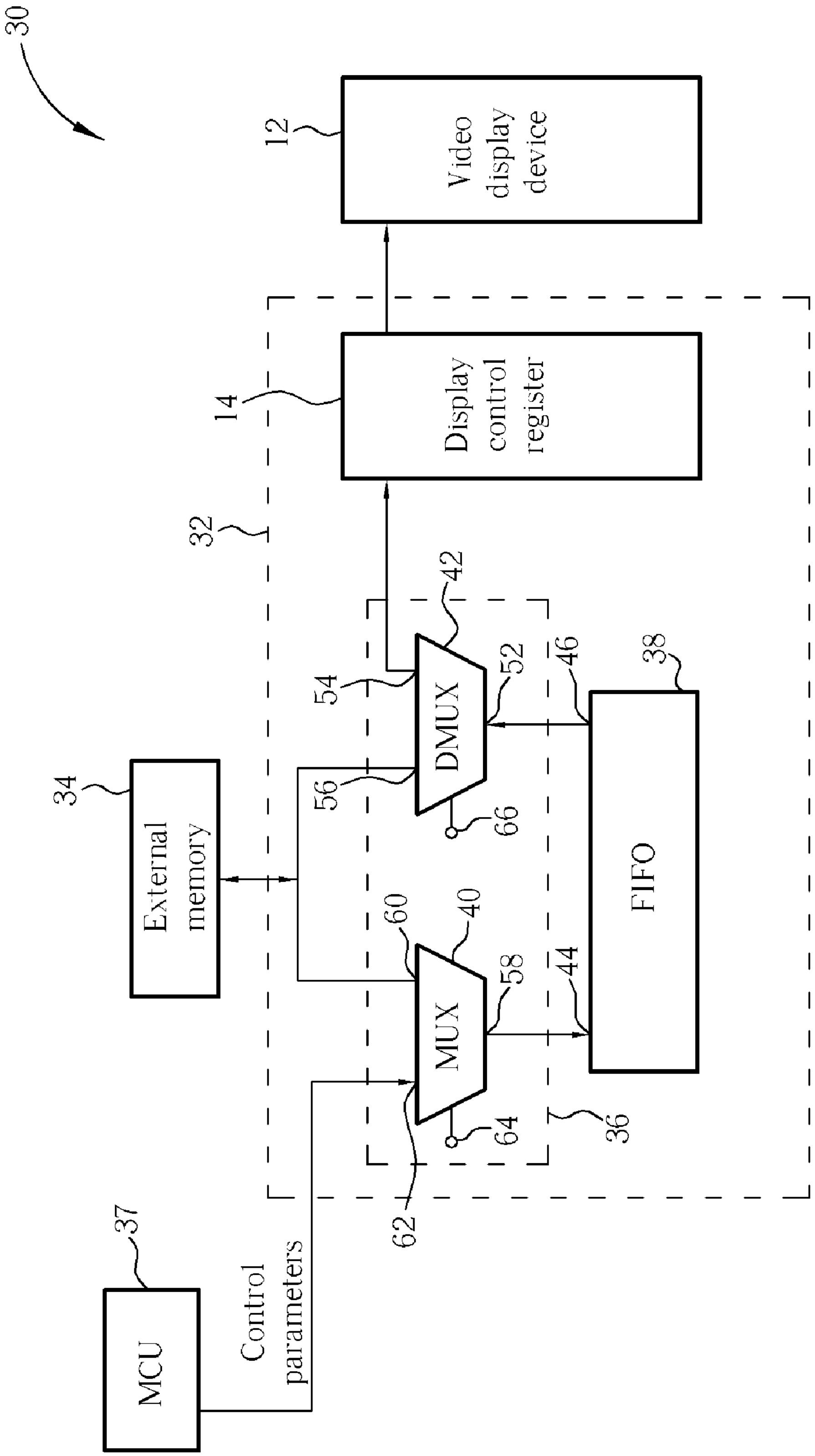
FIG. 3 is a functional block diagram of a video display system of the preferred embodiment according to the present invention.

Please refer to FIG. 3, which is a functional block diagram of a video display system 30 of the preferred embodiment according to the present invention. The video display system 30 comprises the video display device 12, a display controller 32 coupled to the video display device 12, and an external memory 34 coupled to the display controller 32.

The display controller 32 comprises a display control register 14, a control circuit 36 coupled between the display control register 14 and the external memory 34, and a first-in-first-out buffer (FIFO) 38 coupled to the control circuit 36. FIFO 38 temporarily stores data. The control circuit 36 controls the input/output data path of the FIFO 38. For example, data stored in the FIFO 38 is transferred to the external memory 34, and data stored in the external memory 34 is loaded via the FIFO 38 to the display control register 14.

The control circuit 36 comprises a multiplexer 40 coupled between the external memory 34 and the FIFO 38, and a demultiplexer 42 coupled to the external memory 34, the FIFO 38, and the display control register 14. The FIFO 38 comprises an input end 44 and an output end 46.

Figure 4:
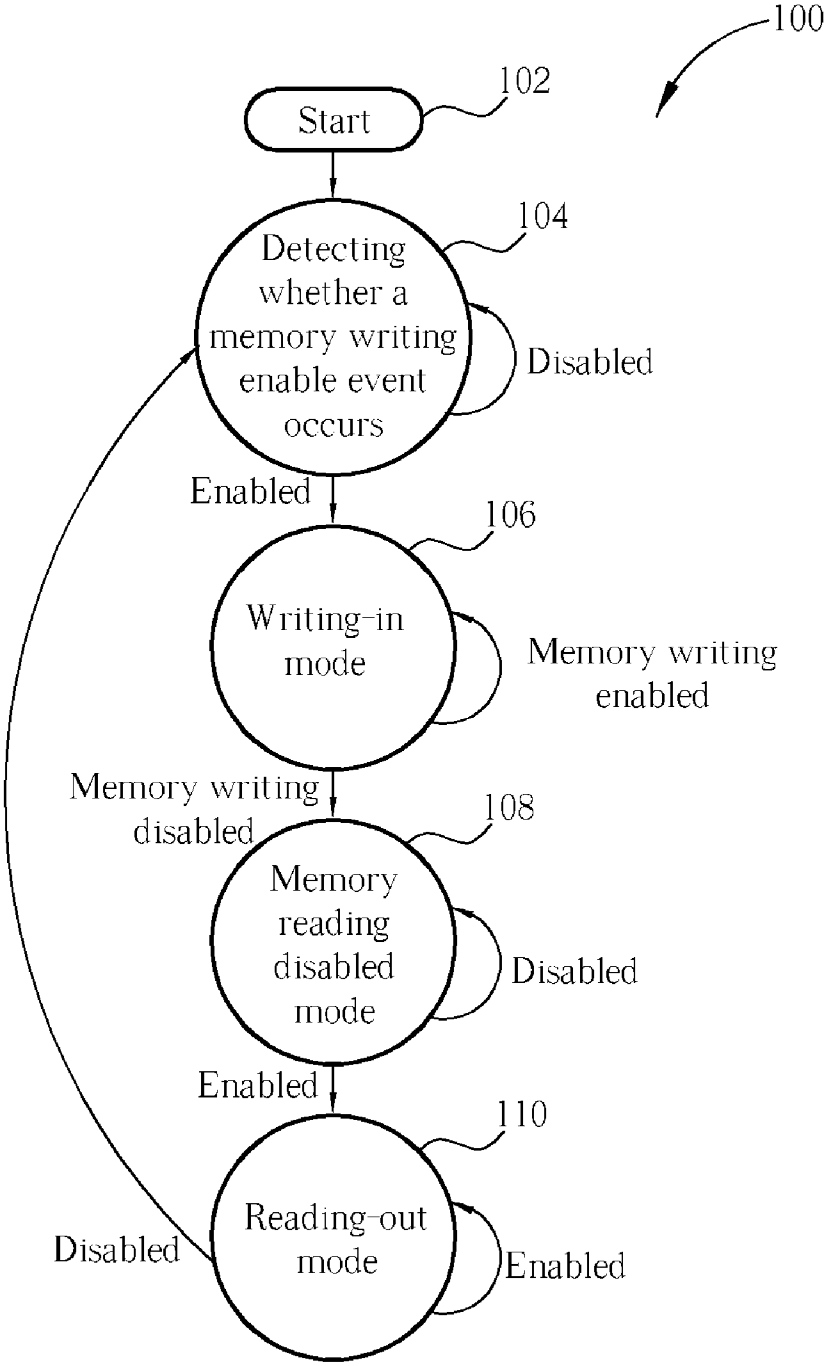
FIG. 4 is a state machine of the control circuit of the video display system shown in FIG. 3

The demultiplexer 42 comprises an input end 52 coupled to the output end 46 of the FIFO 38, a first output end 54 coupled to the display control register 14, and a second output end 56 coupled to the external memory 34. The multiplexer 40 comprises an output end 58 coupled to the input end 44 of the FIFO 38, a first input end 60 coupled to the external memory 34 for receiving data stored in the external memory 34, and a second input end 62 for receiving control parameters. The multiplexer 40 further comprises a control end 64, and the demultiplexer 42 further comprises a control end 66. The control circuit 36 preferably cooperates with a firmware program. The control circuit 36 may operate according to a state machine 100 shown in FIG. 4, is described as follows. The state machine 100 comprises the following states:

State 102: Start. The state machine 100 is initialized to be in a "memory writing disabled" mode, during which the control parameters are prohibited to be written via the FIFO 38 into the external memory 34. Note that the terms "enabled" and "disabled" of the description of the state machine 100 may indicate labels "1" and "0" in digital design.

State 104: The control circuit 36 detects whether a memory writing enable event occurs. If the memory writing enable event is detected, then go to state 106. Otherwise the state machine 100 stays in state 104 and stays in the "memory writing disabled" mode. For example, a micro-controller unit (MCU) 37 issues a writing parameter command to the control circuit 36, so that the control circuit 36 can detect the "memory writing enabled" mode. It should be noted that MCU 37 can be an independent integrated circuit or can be integrated into the display controller 32. The type of MCU 37 can be various, such as the 8051 MCU, to meet different applications.

State 106 represents a "Writing-in" mode. During the "writing-in" mode, the control circuit 36 controls the data paths of the multiplexer 40 and the demultiplexer 42 through the control ends 64 and 66 respectively, so that the control parameters transferred from the MCU 37 are stored in the FIFO 38 first, and then in the external memory 34, which is preferably a DRAM 34. The state machine 100 stays in the state 106 till escaping the "writing-in" mode. It should be noted that, though in state 106 the MCU 37 updates the control parameters, the content stored in the display control register 14 is still unchanged, and the video display device 12 can therefore display video normally. On the other hand, the updated control parameters can be stored temporarily in the FIFO 38 via various ways, such as a data bus or an $I^2C$ bus.

State 108 represents a "memory reading disabled" mode and detects a synchronizing blank period. The control circuit 36 of the display controller 32 decides when to enter a "reading-out" mode by detecting the synchronizing blank period.

State 110 represents a "reading-out" mode. During the "reading-out" mode, the control circuit 36 controls the data paths of the multiplexer 40 and the demultiplexer 42 through the control ends 64 and 66 respectively, so that the control parameters stored in the external memory 34 are transferred via the multiplexer 40 to the FIFO 38 first, and are then stored in the display control register 14. When the control parameters being read are less than those being previously written to DRAM in total quantity, the state machine 100 stays in the "reading-out" mode. After finishing reading, the state machine 100 returns to state 104, i.e. the "memory writing disabled" mode, and the control circuit 36 detects whether a memory writing enable event occurs. The content in the display control register 14 is updated by the control circuit 36 during the synchronizing blank period, without interfering displaying of the video display device 12.

Persons skilled in this art should note that, according to the above disclosure, the control parameters can be written into the display control register 14 of the video display system 30 without requiring hundreds of second registers 24, and the video display device 12 can display video normally. Moreover, FIFO with proper width and depth already installed in the video display system 30 can be selected to act as FIFO 38, without additional FIFO hardware. For example, a width of the FIFO 38 can match that of the external memory 34, which is, for example, 64 bits wide. A need to update display control parameters might happen at any time. For example, a user can change a display mode, resolution, frequency, luminance, and contrast etc. for the video display system 30, and the display control register 14 has to change a start & end display position of a monitor and associated parameters accordingly. FIFO 38 can perform various application function in the display controller 32. For example, the FIFO 38 can further cooperate with MCU 37 to realize an on-screen display (OSD).

Figure 5:
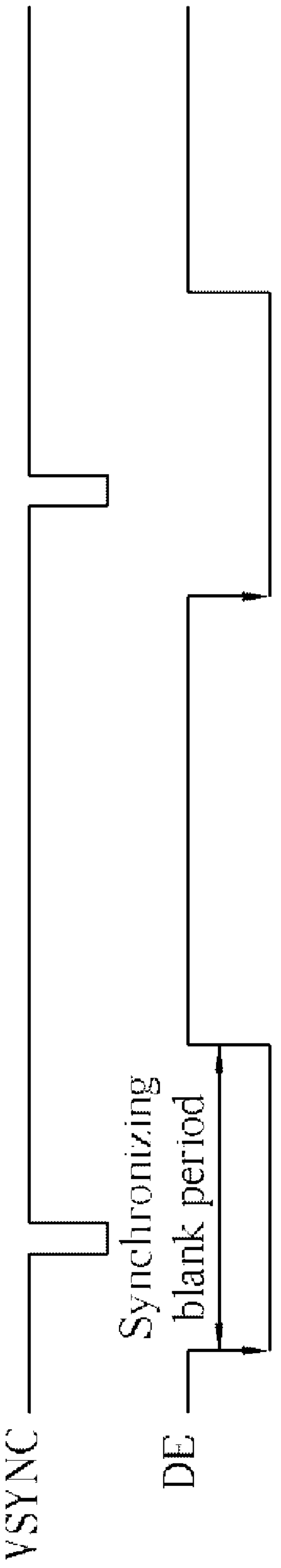
FIG. 5 is a waveform diagram of a synchronizing blank period relating to a vertical synchronizing signal.

Please refer to FIG. 5, which is a waveform diagram of a synchronizing blank period relating to a vertical synchronizing signal. Assertion of the vertical synchronizing blank signal indicates a start of a video frame. A high level of a display enable (DE) signal represents that actual display data is present, while a low level represents the synchronizing blank period associated with the vertical synchronizing signal. The control circuit 36 transfers the control parameters stored in the external memory 34 to the FIFO 38 first, and then to the display control register 14 during the synchronizing blank period only. Those skilled in this art should note that a synchronizing blank period associated with a horizontal synchronizing period also applies to the present invention.

Figure 6:
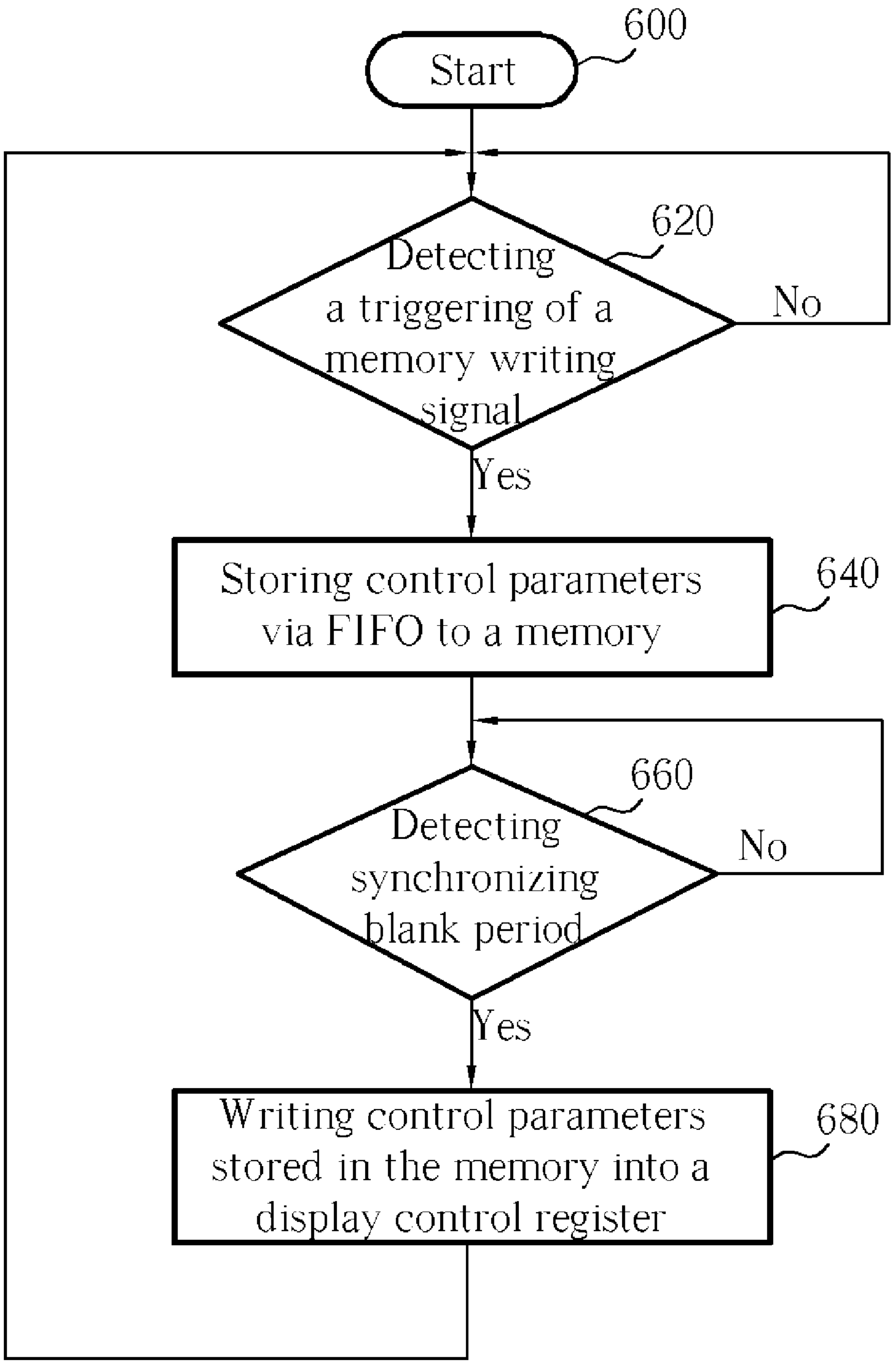
FIG. 6 is a flowchart of a method demonstrating the operation of the state machine shown in FIG. 4.

Please refer to FIG. 6, which is a flowchart of a method demonstrating the state machine 100 shown in FIG. 4. The method starts at step 600. In step 620, the method detects whether or not a memory writing signal is triggered, such as a signal triggering due to a control parameter writing command issued by the MCU 37. If so, the method goes from step 620 to step 640, otherwise the method returns to step 620, i.e. in the "memory writing disabled" mode described in the state machine 100. In step 640, the control parameters are transferred from the FIFO 38 and stored into the external memory 38. It should be noted that though the MCU 37 in step 640 updates the control parameters, the content stored in the display control register 14 remains unchanged, and the video display device 12 can display video normally. In step 660, detect the synchronizing blank period. The method preferably detects a falling-edge of the display enable DE signal, which indicates the start of the synchronizing blank period. If the synchronizing blank period is detected, proceed to step 680, otherwise repeat step 660. In step 680, the control parameters are transferred from the external memory 34 via the FIFO 38 to the display control register 14. Step 680 is performed during the synchronizing blank period only, so that the video display system 30, without requiring the secondary register 24, is free of the video-flickering problem. After completing step 680, the method returns to step 620. The control parameters comprise a variety of kinds of parameters, such as a display mode, a resolution, a frequency, a luminance, a contrast, a start & end display position parameter, etc.

In summary, the present invention discloses a display controller, which comprises a display control register for storing a plurality of control parameters. The display control register is coupled to a video display device. The display controller further comprises a FIFO for storing data, and a control circuit coupled to the display controller and the FIFO for accessing a memory. The control circuit is capable of storing the control parameters via the FIFO to the memory, and then reading the control parameters stored in the memory via the FIFO to the display control register during a synchronizing blank period.

Moreover, the present invention further discloses a state machine for writing a plurality of control parameters into a display control register. The state machine comprises the states of entering a memory writing disabled mode, entering a writing-in mode and writing the control parameters into a memory when detecting a triggering of a memory writing enabled or staying in the memory writing disabled mode, entering a memory reading disabled mode, and entering a reading-out mode and transferring the control parameters stored in the memory to the display control register when detecting a synchronizing blank period or staying in the memory reading disabled mode.

The present invention further discloses a method for writing a plurality of control parameters into a display control register. The method comprises the steps of detecting a triggering of a memory writing signal, storing the control parameters via a FIFO to a memory in response to the triggering of the memory writing signal, and writing the control parameters stored in the memory to the display control register via the FIFO during a synchronizing blank period. The synchronizing blank period is preferably determined by detecting a falling edge of the DE signal.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display controller comprising:

a display control register, coupled to a video display device, for storing a plurality of control parameters;

a first-in-first-out buffer (FIFO) for storing data; and a control circuit coupled to the display control register and the FIFO for accessing a memory, the control circuit comprising:

a multiplexer, comprising:

a first input end coupled to the memory:

a second input end coupled to a microcontroller unit (MCU): and an output end coupled to the FIFO: and a demultiplexer, comprising:

a first output end coupled to the display control register;

a second output end coupled to the memory: and an input end coupled to the FIFO;

wherein the control circuit is capable of storing the control parameters via the FIFO to the memory, and then transferring the control parameters stored in the memory via the FIFO to the display control register during a synchronizing blank period.

2. The display controller of claim 1, wherein the memory is an external memory.

3. The display controller of claim 2, wherein the external memory is a DRAM.

4. The display controller of claim 2, wherein the multiplexer further comprises a first control end and the demultiplexer further comprises a second control end, through both of which data transmission paths of the multiplexer and the demultiplexer are capable of being changed, and the MCU is therefore capable of storing the control parameters to the external memory via the multiplexer, the FIFO, and the demultiplexer sequentially.

5. The display controller of claim 2, wherein the multiplexer further comprises a first control end and the demultiplexer further comprises a second control end, through both of which data transmission paths of the multiplexer and the demultiplexer are capable of being changed, and the external memory is therefore capable of writing the control parameters to the display control register via the multiplexer, the FIFO, and the demultiplexer during the synchronizing blank period.

6. The display controller of claim 5, wherein the synchronizing blank period associates with a vertical synchronizing signal.

7. The display controller of claim 5, wherein the synchronizing blank period associates with a horizontal synchronizing signal.

8. The display controller of claim 1, wherein the MCU is a 8051 microcontroller unit.

9. The display controller of claim 1, wherein the MCU transfers the control parameters to the control circuit via a data bus.

10. The display controller of claim 1, wherein the MCU transfers the control parameters to the control circuit via an $I^2C$ bus.

* * * * *